US012661711B2

(12) United States Patent
　　Griffis et al.

(10) Patent No.: US 12,661,711 B2
(45) Date of Patent: Jun. 23, 2026

(54) POWDER REMOVAL SYSTEM FOR POWDER BASED MANUFACTURING METHODS

(71) Applicant: GENERAL ELECTRIC COMPANY, Schenectady, NY (US)

(72) Inventors: Clay Thomas Griffis, Greenville, SC (US); Archie L. Swanner, Greenville, SC (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 382 days.

(21) Appl. No.: 18/323,542

(22) Filed: May 25, 2023

(65) Prior Publication Data

US 2024/0390981 A1　　Nov. 28, 2024

(51) Int. Cl.

| | |
|---|---|
| *B22F 10/68* | (2021.01) |
| *B08B 3/02* | (2006.01) |
| *B08B 5/02* | (2006.01) |
| *B08B 5/04* | (2006.01) |
| *B22F 12/30* | (2021.01) |
| *B33Y 30/00* | (2015.01) |
| *B33Y 40/00* | (2020.01) |

(52) U.S. Cl.
　　CPC .............. *B22F 10/68* (2021.01); *B22F 12/30* (2021.01); *B08B 3/02* (2013.01); *B08B 5/02* (2013.01); *B08B 5/04* (2013.01); *B33Y 30/00* (2014.12); *B33Y 40/00* (2014.12)

(58) Field of Classification Search
　　CPC .......... B22F 10/68; B22F 12/30; B22F 10/14; B22F 10/16; B22F 2003/244; B22F 10/28; B22F 2999/00; B22F 12/70; B08B 3/02; B08B 5/02; B08B 5/04; B33Y 30/00; B33Y 40/00; B33Y 10/00; B33Y 40/20; B29C 64/153; B29C 64/35; Y02P 10/25
　　See application file for complete search history.

(56) References Cited

U.S. PATENT DOCUMENTS

| | | | |
|---|---|---|---|
| 8,185,229 | B2 | 5/2012 | Davidson |
| 10,967,572 | B2 | 4/2021 | Schwerdtfeger et al. |
| 2004/0084814 | A1 | 5/2004 | Boyd et al. |
| 2015/0258744 | A1 | 9/2015 | Muller et al. |
| 2017/0072466 | A1 | 3/2017 | Zehavi et al. |

(Continued)

FOREIGN PATENT DOCUMENTS

EP　　3417961 A1 * 12/2018　............. B33Y 80/00

OTHER PUBLICATIONS

Extended European Search Report, EP 24173612.3, dated Oct. 29, 2024 (9 pp.).

*Primary Examiner* — Rebecca Janssen
(74) *Attorney, Agent, or Firm* — Eversheds Sutherland (US) LLP

(57) ABSTRACT

The present application provides a powder removal system for removing powder from an additive manufacturing component with a number of component voids therein. The powder removal system may include a build plate with a number of build plate conduits that aligns with the component voids, a powder removal plate with a number of powder removal plate conduits that aligns with the build plate conduit, and a pressurized fluid system in communication with the powder removal plate conduits.

20 Claims, 6 Drawing Sheets

(56) References Cited

U.S. PATENT DOCUMENTS

| | | | |
|---|---|---|---|
| 2017/0232552 A1 | 8/2017 | Crear et al. | |
| 2018/0009007 A1 | 1/2018 | Craft et al. | |
| 2018/0207889 A1 | 7/2018 | Swanner, Jr. et al. | |
| 2018/0214984 A1* | 8/2018 | Haro Gonzalez | B22F 10/47 |
| 2018/0297296 A1* | 10/2018 | Schwerdtfeger | B22F 12/30 |
| 2019/0118468 A1 | 4/2019 | Bobar et al. | |
| 2020/0406545 A1* | 12/2020 | Schmale | B33Y 30/00 |
| 2022/0080667 A1 | 3/2022 | Griffis et al. | |
| 2022/0098992 A1 | 3/2022 | Griffis et al. | |
| 2023/0013204 A1 | 1/2023 | Murray et al. | |

* cited by examiner

100

I/O
Device
260

210

PU 230

250

Memory 220

AM Control System 140

Code 160

Storage System 270
Code 160

I/O 240

150

180    190    110

200

175

170

120

130

360

380

440

POWDER REMOVAL SYSTEM FOR POWDER BASED MANUFACTURING METHODS

TECHNICAL FIELD

The present application and the resultant patent relate generally to additive manufacturing systems and more particularly relate to an additive manufacturing system with a powder removal system to remove residual powder within voids formed within manufactured components.

BACKGROUND

Complex components may be built using additive manufacturing systems. Such additive manufacturing systems may build such components by continuously layering powder material in predetermined areas and performing a material transformation process, such as sintering or melting, on the powder material. The material transformation process may alter the physical state of the powder material from a granular composition to a solid material to build the component. The components built using the additive manufacturing systems may have nearly identical physical attributes as conventional components typically made by performing machining processes on stock material.

Conventional additive manufacturing systems generally build components on large, solid build plates. These conventional build plates are often made of two inches (or more) of a solid metal such as stainless steel and the like. Although suitable for some components, the solid material forming the conventional build plates may create issues when manufacturing certain components with unique features. For example, some components manufactured on conventional build plates may include conduits or voids formed therein. Some of these conduits or voids may include an aperture formed on and/or obstructed by the solid build plate. As a result, the conduit of the component may not be capable of being cleared of residual powder, particles, and/or debris before undergoing post-processing, such as polishing, coating, and/or heat treatment. For example, the residual powder that may remain within the conduits may become sintered when performing the post-processing on the component. As a result, the powder may result in partial or complete blockage of the conduit within the component. Blockage of the conduit may adversely affect the intended functionality and/or operation of the component built on the conventional build plate.

SUMMARY

The present application and the resultant patent thus provide a powder removal system for removing powder from an additive manufacturing component with a number of component voids therein. The powder removal system may include a build plate with a number of build plate conduits that aligns with the component voids, a powder removal plate with a number of powder removal plate conduits that aligns with the build plate conduits, and a pressurized fluid system in communication with the powder removal plate conduits.

The present application and the resultant patent further provide a method of removing residual powder from an additive manufacturing component with a number of component voids therein. The method including the steps of positioning a build plate with a number of build plate conduits on a powder removal plate with a number of powder removal plate conduits such the build plate conduits align with the powder removal plate conduits, manufacturing the component on the build plate such the component voids align with the build plate conduits, flowing a pressurized fluid through the powder removal plate conduits and the build plate conduits and into the component voids, and forcing the residual powder out of the component voids.

The present application and the resultant patent further provide an additive manufacturing system for manufacturing a component with a number of component voids therein. The additive manufacturing system may include a source of powder, an applicator for manufacturing the component from the source of powder, a build plate for building the component thereon, the build plate having a number of build plate conduits that aligns with the component voids, a powder removal plate with a number of powder removal plate conduits that aligns with the build plate conduits, and a pressurized fluid system in communication with the powder removal plate conduits.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
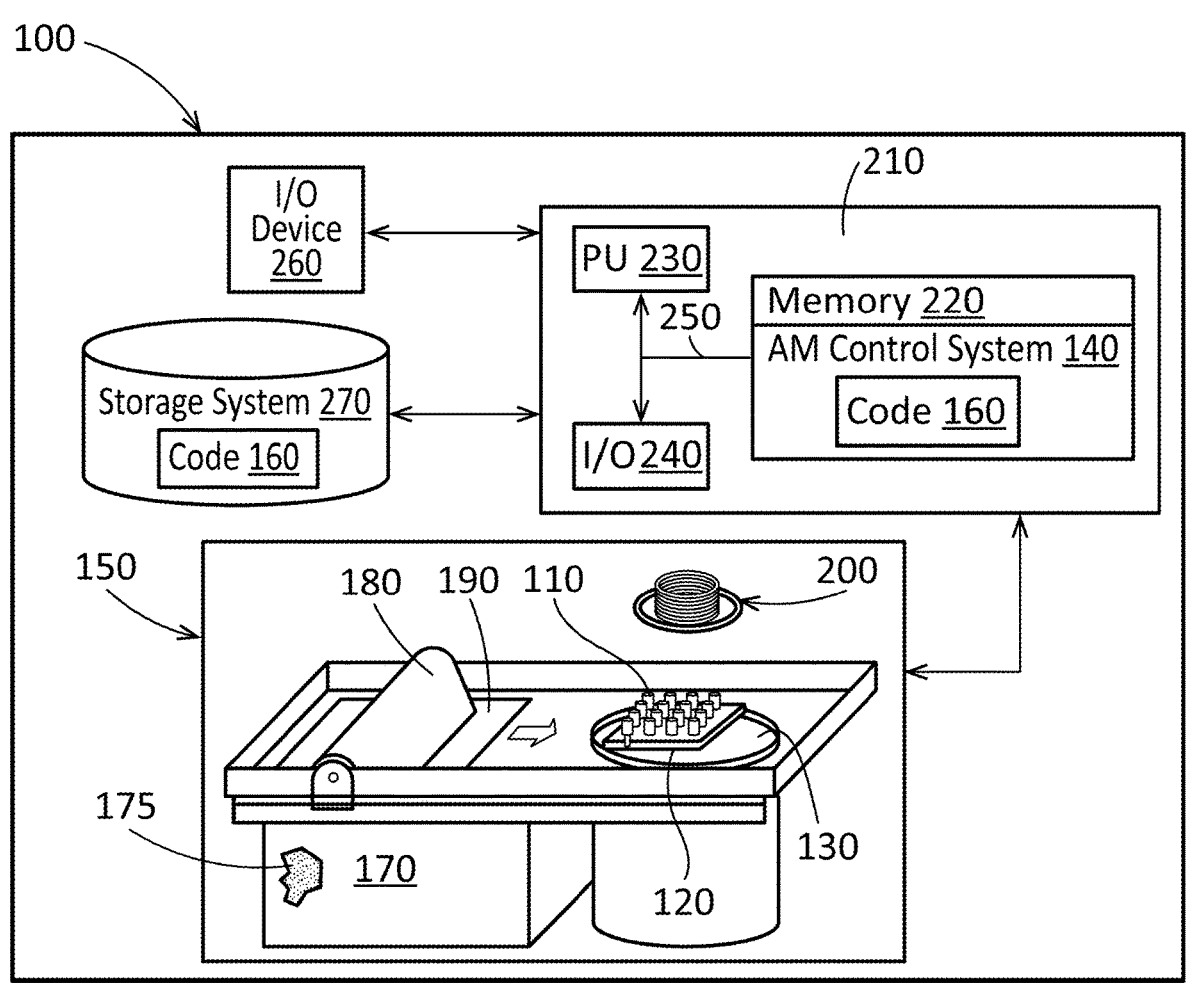
FIG. 1 is a block diagram of an additive manufacturing system including control systems.

Referring now to the drawings, in which like numerals refer to like elements throughout the several views, FIG. 1 is a schematic/block view of an illustrative computerized additive manufacturing system 100 for manufacturing a component 110 on a build plate 120 positioned on a build platform 130. In this example, the additive manufacturing system 100 is arranged for direct metal laser melting (DMLM), a metal powder additive manufacturing process. It is understood that the general teachings of this disclosure are equally applicable to other forms of additive manufacturing. The additive manufacturing system 100 generally includes a computerized additive manufacturing control system 140 and an additive manufacturing printer 150. The additive manufacturing system 100 executes code 160 that includes a set of computer-executable instructions to physically generate the component 110 on the build plate 120 using the additive manufacturing printer 150. Each additive manufacturing process may use different raw materials in the form of, for example, fine-grain metal powder 175, a stock of which may be held in a chamber 170 of the additive manufacturing printer 150. For example, the component 110 may be made of a metal or a metal alloy. An applicator 180 may create a thin layer of a raw material 190 spread out as the blank canvas from which each successive slice of the final component 110 may be created. In the example shown, a laser or electron beam 200, positioned above the build plate 120, fuses particles for each slice, as defined by the code 160. Although one laser or electron beam 200 is shown, it is understood that the additive manufacturing system 100 may include any number. Various components of the additive manufacturing printer 150 may move to accommodate the addition of each new layer.

The additive manufacturing control system 140 is shown as being implemented on a computer 210 as computer program code. To this extent, the computer 210 is shown including a memory 220, a processor 230, an input/output (I/O) interface 240, and a bus 250. Further, the computer 210 is shown in communication with an external I/O device/resource 260 and an external storage system 270. In general, the processor 230 executes computer program code, such as the additive manufacturing control system 140 that may be stored in the memory 220 and/or the storage system 270 under instructions from the code 160 representative of the component 110. While executing computer program code, the processor 230 may read and/or write data to/from the memory 220, the storage system 270, the I/O device 240, and/or the additive manufacturing printer 150. The bus 250 provides a communication link between each of the components. The I/O device 240 may include any device that enables a user to interact with the computer 210 (e.g., a keyboard, a pointing device, a display, and the like). The computer 210 is only representative of various possible combinations of hardware and software that may be used herein. For example, the processor 230 may include a single processing unit or may be distributed across one or more processing units in one or more locations, e.g., on a client and server. Similarly, the memory 220 and/or the storage system 270 may reside at one or more physical locations. The memory 220 and/or the storage system 270 may include any combination of various types of non-transitory computer readable storage medium including magnetic media, optical media, random access memory (RAM), read only memory (ROM), and the like. The computer 210 may include any type of computing device such as a network server, a desktop computer, a laptop, a handheld device, a mobile phone, a pager, a personal data assistant, etc.

The additive manufacturing processes begin with a non-transitory computer readable storage medium (e.g., the memory 220, the storage system 270, and the like) storing code 160 representative of the component 110. As noted, the code 160 includes a set of computer-executable instructions defining the component 110 that can be used to physically generate the component 110. For example, the code 160 may include a precisely defined 3D model of the component 110 and may be generated from any of a large variety of well-known computer aided design (CAD) software systems such as AutoCAD®, TurboCAD®, DesignCAD 3D Max, and the like. In this regard, the code 160 may take any now known or later developed file format. For example, the code 160 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional component to be fabricated on any additive manufacturing printer. The additive manufacturing system 100 executes the code 160, dividing the component 110 into a series of thin slices that it assembles using the additive manufacturing printer 150 in successive layers of powder. In the DMLM example, each layer may be melted or sintered to the exact geometry defined by the code 160 and fused to the preceding layer. Subsequently, the component 110 may be subject to any variety of finishing processes, e.g., minor machining, sealing, polishing, assembly to another part, and similar processes.

Figure 2:
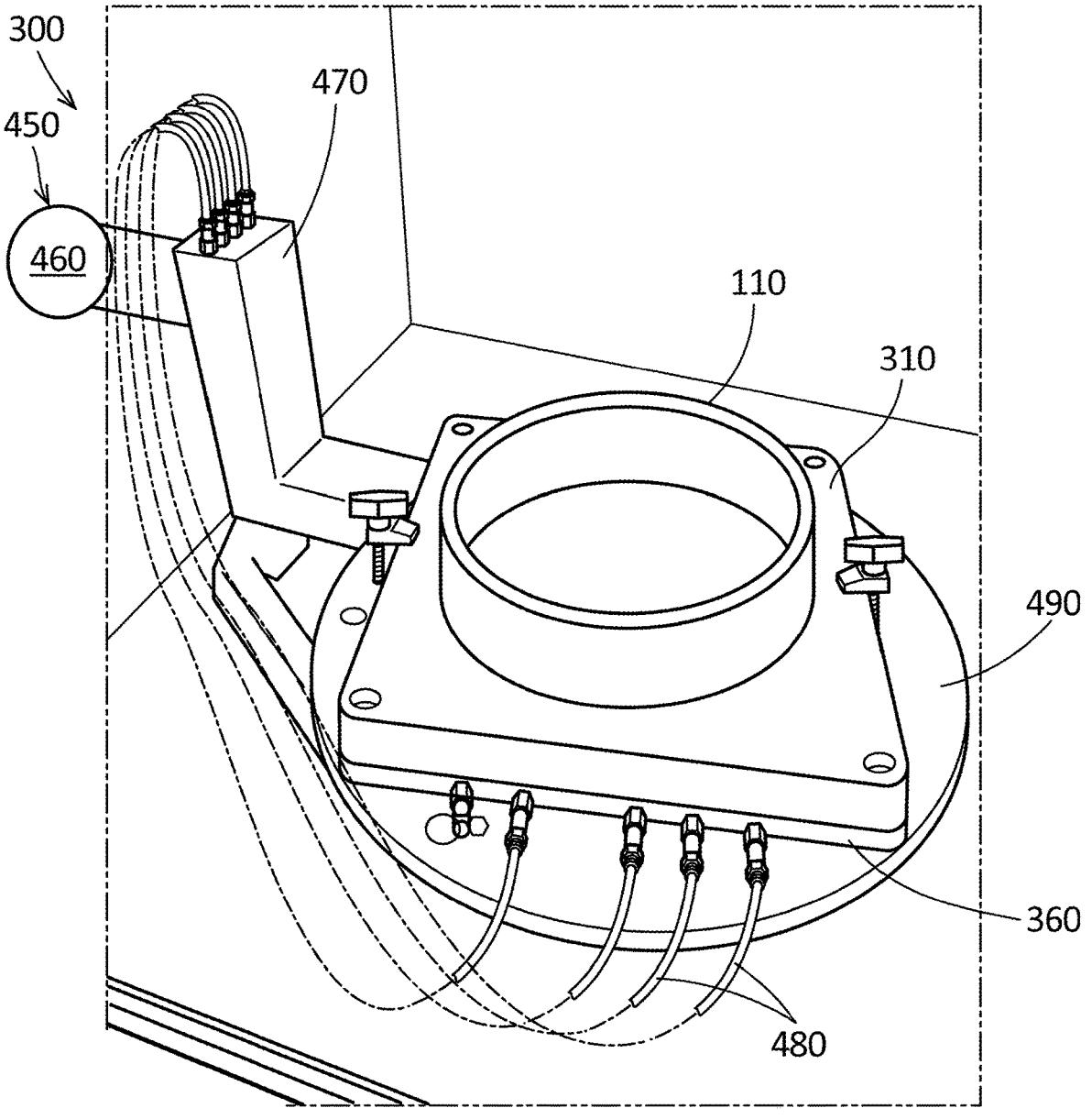
FIG. 2 is a perspective view of a powder removal system as may be described herein.
Figure 3:
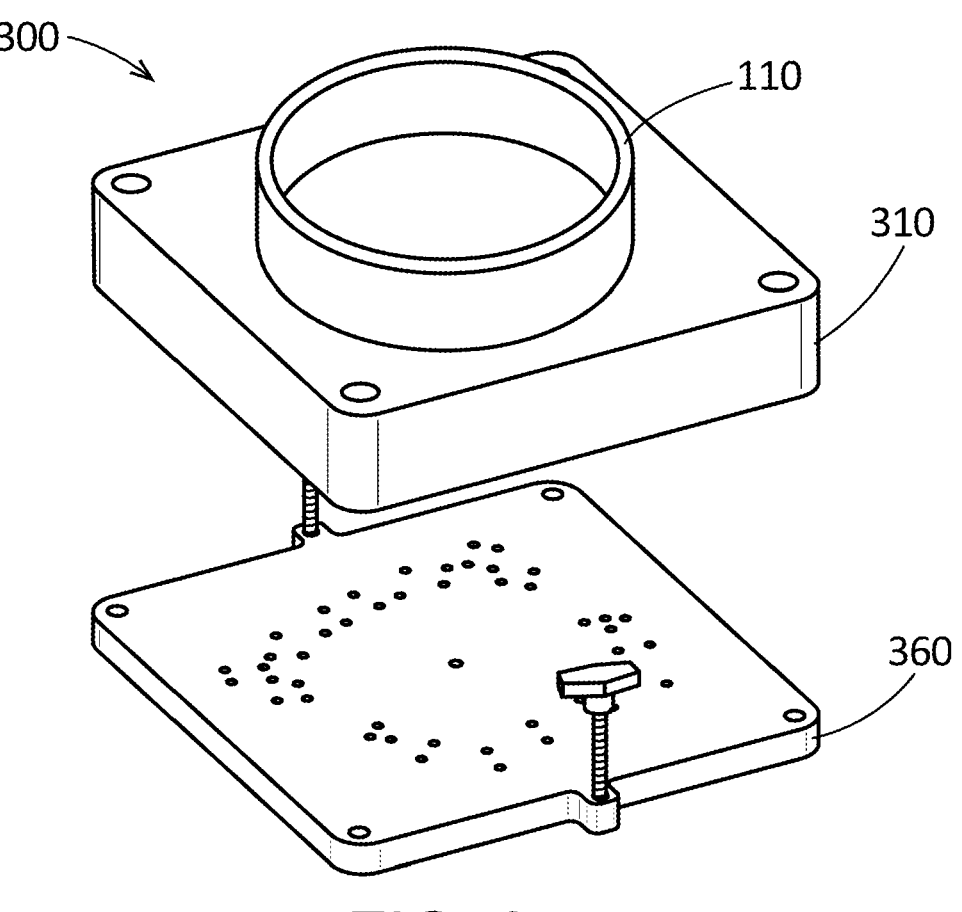
FIG. 3 is a perspective view of a portion of the powder removal system of FIG. 2 with a powder removal plate adjacent to a build plate.
Figure 4:
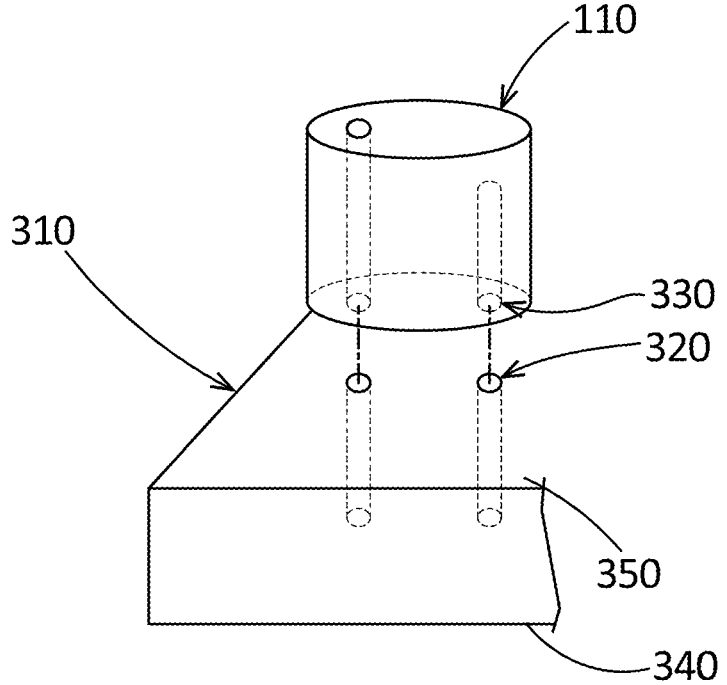
FIG. 4 is a partial side view of the build plate of the powder removal system of FIG. 2.
Figure 5:
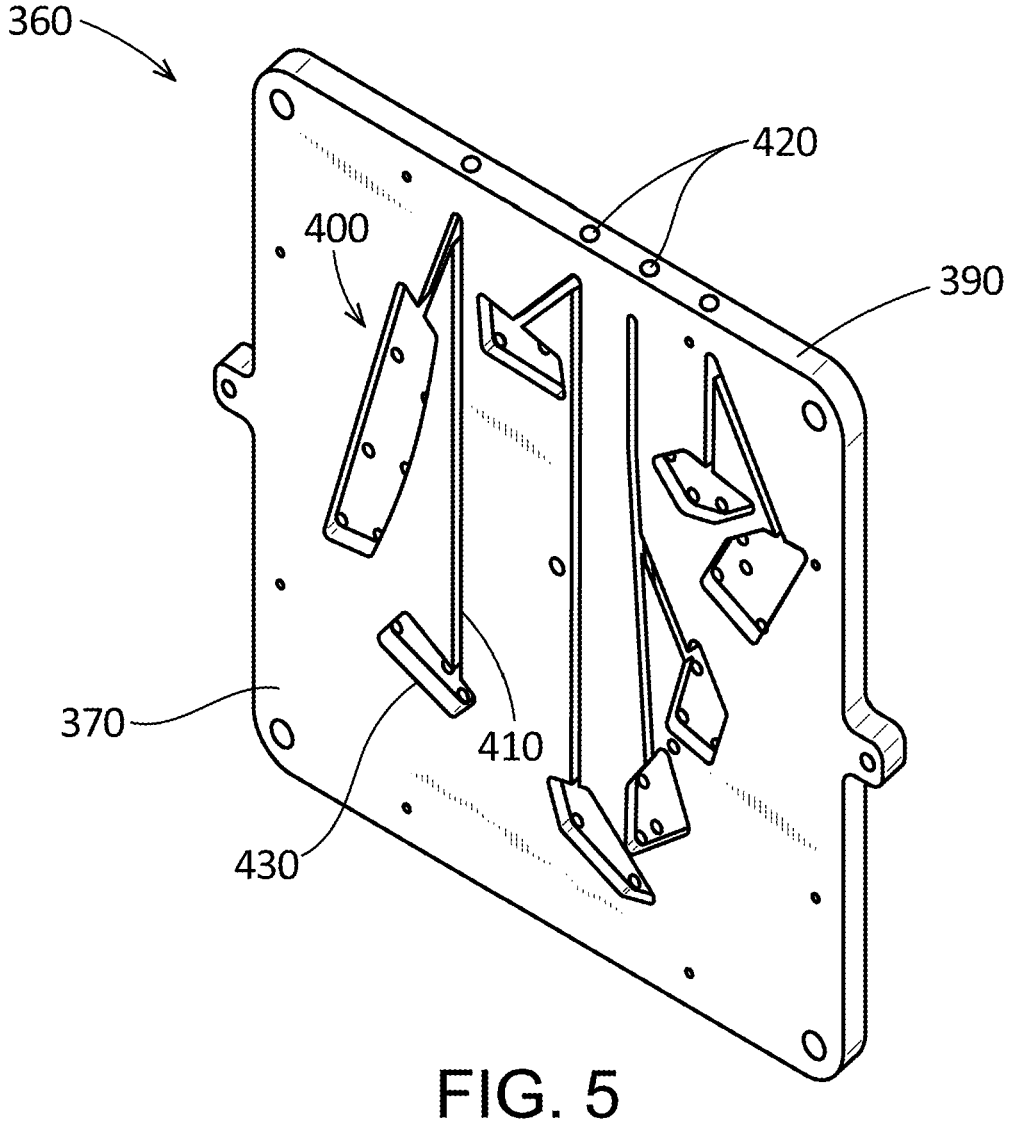
FIG. 5 is a perspective view of a powder removal plate of the powder removal system of FIG. 2.
Figure 6:
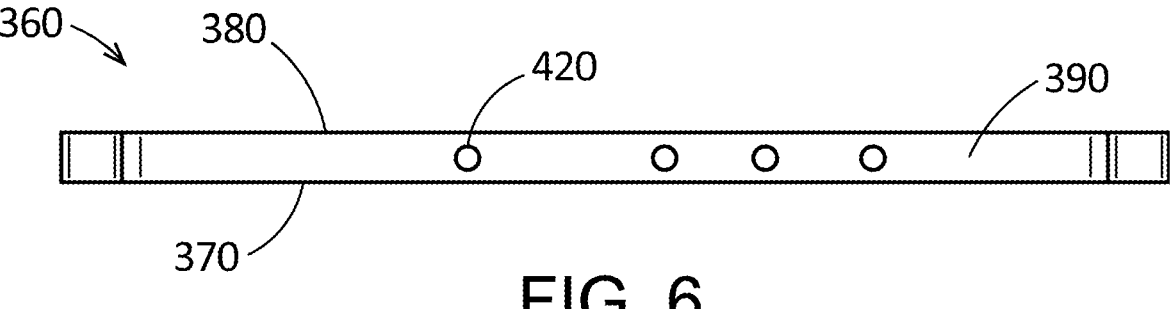
FIG. 6 is a side view of the powder removal plate of FIG. 5.
Figure 7:
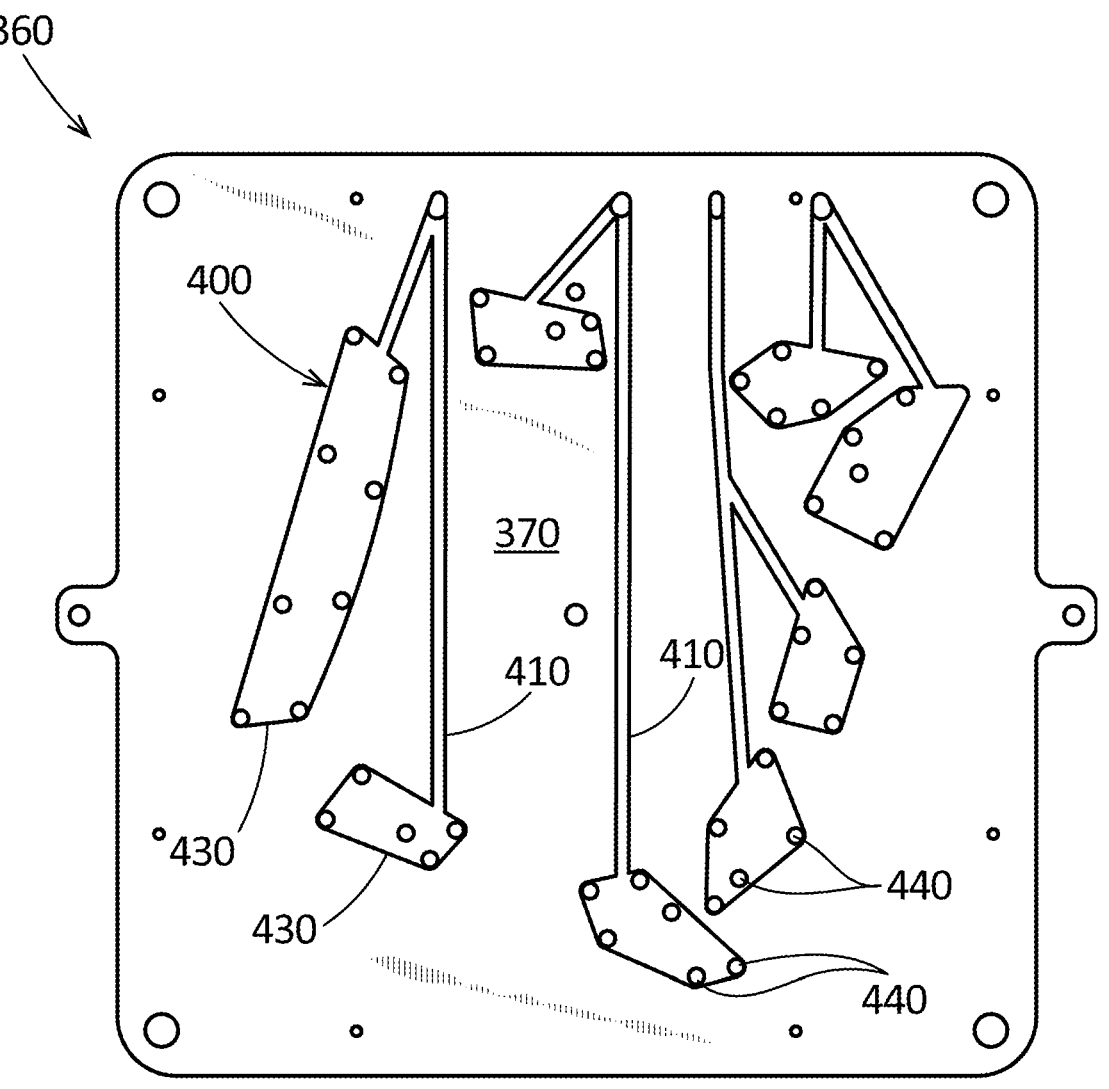
FIG. 7 is a bottom plan view of the powder removal plate of FIG. 5.
Figure 8:
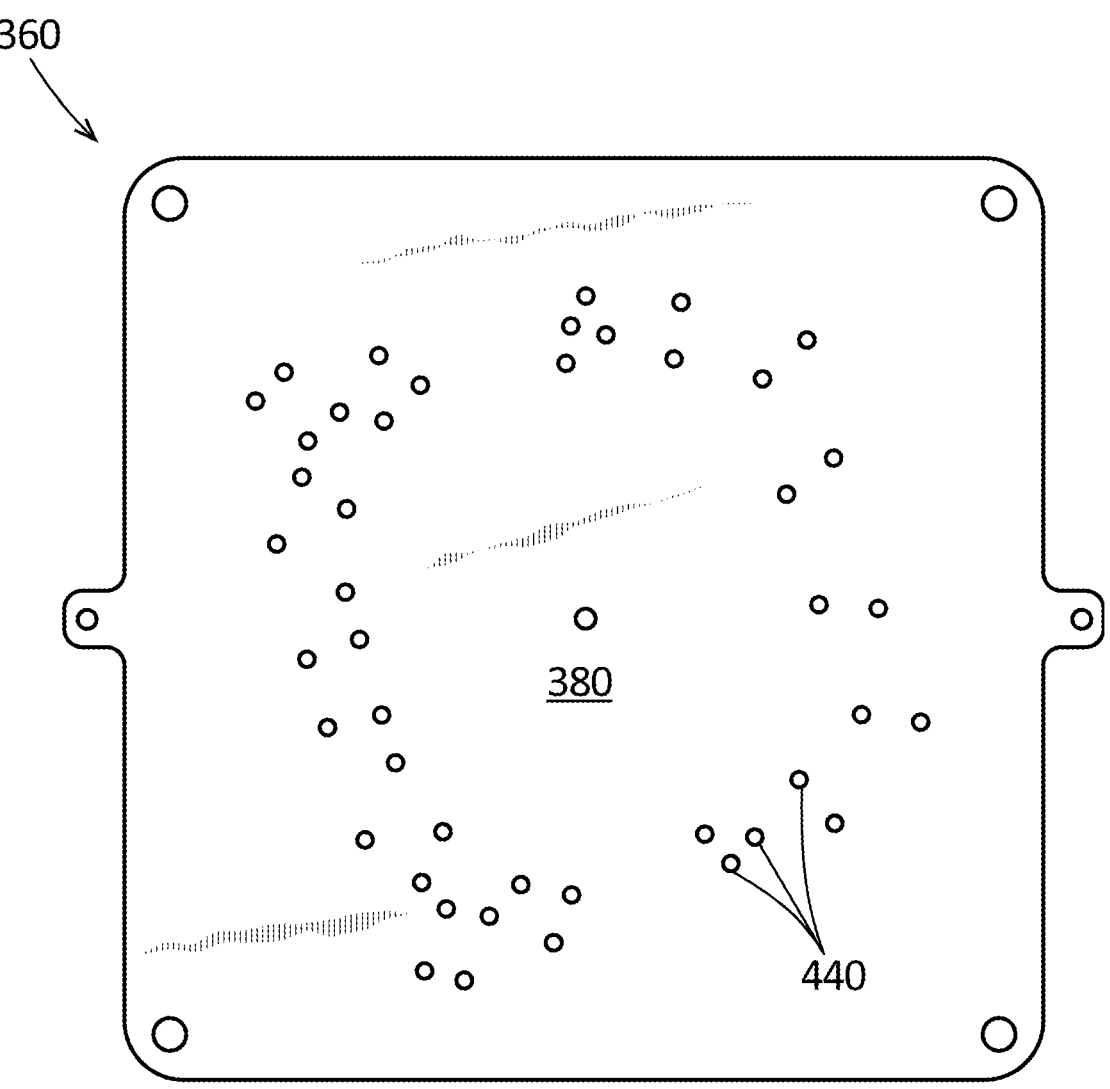
FIG. 8 is a top plan view of the powder removal plate of FIG. 5.

FIGS. 2-4 show an example of a powder removal system 300 as may be described herein. The powder removal system 300 may include a holey additive build plate 310. Generally described, the holey additive build plate 310 may be a flat block of solid metal such as stainless steel and the like. In this example, the holey additive build plate 310 includes a number of build plate conduits 320 extending therethrough. The build plate conduits 320 are sized and positioned in the holey additive build plate 310 to align with the desired size and shape of the component 110 to be built thereon. Specifically, the build plate conduits 320 may align with a number of component conduits or voids 330 within the component 110. The build plate conduits 320 may extend from a bottom or a build plate first side 340 to a top or a build plate second side 350. An example of the holey additive build plate 310 is shown in commonly owned U.S. Pat. No. 10,967,572 B2. U.S. Pat. No. 10,967,572 B2 is incorporated herein by reference in full.

The powder removal system 300 includes a powder removal plate 360. The powder removal plate 360 also may be made from a block of metal such as stainless steel and the like although plastics and other types of non-metals also may be used. The powder removal plate 360 may be bolted or otherwise attached to the holey additive build plate 310. As is shown in FIGS. 5-8, the powder removal plate 360 may extend from a bottom or a powder removal plate first side 370 to a top or a powder removal plate second side 380 with a powder removal plate sidewall 390 therebetween. The size, shape, and configuration of the powder removal plate 360 may vary.

The powder removal plate 360 may include a fluid distribution system 400 formed therein. The fluid distribution system 400 may include a number of internal channels 410. The internal channels 410 may extend from a number of input ports 420 positioned about the powder removal plate sidewall 390 to a number of internal fluid plenums 430. Alternatively, the internal ports 420 may extend from the bottom or the powder removal plate first side 370 to the top or the powder removal plate second side 380. Each fluid plenum 430 may have one or more powder removal plate conduits 440 formed therein. Each powder removal plate conduit 440 may extend from the fluid plenum 430 to the top or the powder removal plate second side 380. In a manner similar to the build plate conduits 320 aligning with the component conduits or voids 330, the powder removal plate conduits 440 align with the build plate conduits 320. Specifically, the number and position of the powder removal plate conduits 440 largely matches that of the build plate conduits 320. Other components and other configurations may be used herein.

The size and shape of the fluid plenums 430 may be based largely on manufacturing concerns in allowing the internal channels 410 to extend from the powder removal plate sidewall 390 to each of the powder removal plate conduits 440. The number of the powder removal plate conduits 440 in each of the fluid plenums 430 may be largely equal so as to ensure a substantially equal fluid flow rate and pressure therethrough.

The powder removal system 300 may include a pressurized fluid system 450 in communication with the powder removal plate 360. The pressurized fluid system 450 may provide a fluid such as a gas or a liquid or entrained combinations thereof at a positive pressure to the powder removal plate 360. Alternatively, the pressurized fluid system 450 may draw a vacuum at a negative pressure from the powder removal plate 360. The pressurized fluid system 450 may include a source of a fluid 460. The source of the fluid 460 may be under pressure such as a compressed gas or the source of the fluid 460 may be in communication with a pressurizing device 470 such as a pump and the like. The pressurizing device 470 may provide positive or negative pressure and/or may be able to alternate between positive and negative pressure. Variable pressures also may be used. The pressurized fluid system 450 may include a number of fluid lines 480 in communication with the input ports 420 on the powder removal plate sidewall 390. The fluid flow may be metered herein. Other components and other configurations may be used herein.

The powder removal system 300 may include a build platform 490. The powder removal plate 360 and the holey additive build plate 310 may be positioned on the build platform 490 during manufacture of the component 110 and/or during post-processing. The build platform 490 may provide movement and/or vibration to the powder removal plate 360 and the holey additive build plate 310 as needed to assist in removing the powder 175 from the component 110. Other components and other configurations may be used herein.

In use, the number and position of the build plate conduits 320 of the holey additive build plate 310 and the powder removal plate conduits 440 of the powder removal plate 360 are designed to align with the number and position of the component conduits or voids 330 of the component 110 as it is manufactured. Once manufacture is complete, the pressurized fluid system 450 of the powder removal system 300 may provide a fluid such as a gas or a liquid to the fluid distribution system 400 of the powder removal plate 360. Specifically, the fluid passes through the fluid lines 480 and into the input ports 420 on the powder removal plate sidewall 390 and into the internal channels 410 of the powder removal plate 360. The fluid may pass through the fluid plenums 430, into the powder removal plate conduits, and into the build plate conduits 320 of the holey additive build plate 310. The fluid then may pass out of the build plate conduits 320 and into the component conduits or voids 330 of the component 110. The pressurized fluid serves to loosen and remove any excess or residual powder therein. Likewise, a vacuum also may be pulled in the opposite manner to pull any powder therein. Various types of etching chemicals also may be used as the fluid herein. Although the powder removal system 300 has been described herein in the context of the manufacturing process, the powder removal plate 360 also may be used in post-manufacturing processing at a powder removal station and the like.

The powder removal system 300 thus uses the pressurized air/gas/liquid to forcibly remove any residual powder that may be trapped within the internal geometry of the component 110. This powder generally may be unremovable due to complex internal serpentine passageways, the lack of an outlet for through-flow, and the like. Moreover, the powder could not be removed via basic motion and vibration due to the complexity of the geometry and the flow characteristics of the powder. Without removing the powder, the finish component may not be usable. The powder removal system 300 allows for the removal of powder on a repeatable basis by using the conduits 320 on the existing holey additive build plate 310. The powder then may be evacuated through the conduits 320, 330 on top of the component 110 or the holey additive build plate 310. The ability to remove the powder in such a manner will allow for even more complex geometries in the final component 110.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A powder removal system for removing powder from an additive manufacturing component with a plurality of component voids therein, comprising a build plate; the build plate comprising a plurality of build plate conduits that aligns with the plurality of component voids; a powder removal plate; the powder removal plate comprising a plurality of powder removal plate conduits that aligns with the plurality of build plate conduits; and a pressurized fluid system in communication with the plurality of powder removal plate conduits.

2. The powder removal system of any preceding clause, wherein the pressurized fluid system comprises a source of a fluid.

3. The powder removal system of any preceding clause, wherein the source of a fluid comprises a gas or a liquid.

4. The powder removal system of any preceding clause, wherein the source of a fluid is in communication with a pressurizing device.

5. The powder removal system of any preceding clause, wherein the pressurized fluid system pulls a vacuum.

6. The powder removal system of any preceding clause, wherein the powder removal plate comprises a fluid distribution system.

7. The powder removal system of any preceding clause, wherein the powder removal plate comprises a first side, a second side, and a sidewall.

8. The powder removal system of any preceding clause, wherein the powder removal plate comprises a plurality of internal channels.

9. The powder removal system of any preceding clause, wherein the plurality of internal channels comprises a plurality of input ports positioned on the sidewall.

10. The powder removal system of any preceding clause, wherein the plurality of internal channels extends from the plurality of input ports and along the first side of the powder removal plate.

11. The powder removal system of any preceding clause, wherein the plurality of channels extends to a plurality of fluid plenums.

12. The powder removal system of any preceding clause, wherein a number of the plurality of powder removal plate conduits are positioned in each of the plurality of fluid plenums.

13. The powder removal system of any preceding clause, wherein the build plate is clamped to the powder removal plate.

14. The powder removal system of any preceding clause, further comprising a build platform and wherein the build platform vibrates.

15. A method of removing residual powder from an additive manufacturing component with a plurality of component voids therein, comprising positioning a build plate with a plurality of build plate conduits on a powder removal plate with a plurality of powder removal plate conduits such the plurality of build plate conduits aligns with the plurality of powder removal plate conduits; manufacturing the component on the build plate such the plurality of component voids aligns with the plurality of build plate conduits; flowing a pressurized fluid through the plurality of powder removal plate conduits and the plurality of build plate conduits and into the plurality of component voids; and forcing the residual powder out of the plurality of component voids.

16. An additive manufacturing system for manufacturing a component with a plurality of component voids therein, comprising a source of powder; a printer for manufacturing the component from the source of powder; a build plate for building the component thereon; the build plate comprising a plurality of build plate conduits that aligns with the plurality of component voids; a powder removal plate; the powder removal plate comprising a plurality of powder removal plate conduits that aligns with the plurality of build plate conduits; and a pressurized fluid system in communication with the plurality of powder removal plate conduits.

17. The additive manufacturing system of any preceding clause, wherein the pressurized fluid system comprises a source of a gas fluid or a liquid fluid.

18. The additive manufacturing system of any preceding clause, wherein the source of the gas fluid or the liquid fluid is in communication with a pressurizing device.

19. The additive manufacturing system of any preceding clause, wherein the pressurized fluid system pulls a vacuum.

20. The additive manufacturing system of any preceding clause, further comprising a build platform and wherein the build platform vibrates.

We claim:

1. A powder removal system for removing powder from an additive manufacturing component with a plurality of component voids therein, comprising:
a flat build plate;
the flat build plate comprising a block of solid metal with a top side and a bottom side;
the flat build plate comprising a plurality of build plate conduits that aligns with the plurality of component voids in the additive manufacturing component positioned on the top side of the flat build plate;
a powder removal plate positioned on the bottom side of the flat build plate;
the powder removal plate comprising a first side and a second side and a plurality of powder removal plate conduits that aligns with the plurality of build plate conduits;
wherein the plurality of build plate conduits extend along the first side of the powder removal plate; and
a pressurized fluid system in communication with the plurality of powder removal plate conduits such that a fluid extends through the powder removal plate, into the flat build plate, and into the additive manufacturing component.

2. The powder removal system of claim 1, wherein the pressurized fluid system comprises a source of the fluid.

3. The powder removal system of claim 2, wherein the source of a fluid comprises a gas or a liquid.

4. The powder removal system of claim 2, wherein the source of a fluid is in communication with a pressurizing device.

5. The powder removal system of claim 1, wherein the pressurized fluid system pulls a vacuum.

6. The powder removal system of claim 1, wherein the powder removal plate comprises a fluid distribution system.

7. The powder removal system of claim 1, wherein the powder removal plate comprises a sidewall.

8. The powder removal system of claim 7, wherein the powder removal plate comprises a plurality of internal channels.

9. The powder removal system of claim 8, wherein the plurality of internal channels comprises a plurality of input ports positioned on the sidewall.

10. The powder removal system of claim 9, wherein the plurality of internal channels extends from the plurality of input ports.

11. The powder removal system of claim 8, wherein the plurality of internal channels extends to a plurality of fluid plenums.

12. The powder removal system of claim 11, wherein a number of the plurality of powder removal plate conduits are positioned in each of the plurality of fluid plenums.

13. The powder removal system of claim 1, wherein the flat build plate is clamped to the powder removal plate.

14. The powder removal system of claim 1, further comprising a build platform and wherein the build platform vibrates.

15. A method of removing residual powder from an additive manufacturing component with a plurality of component voids therein, comprising:
positioning a flat build plate with a plurality of build plate conduits on top of a powder removal plate with a plurality of powder removal plate conduits such the plurality of build plate conduits aligns with the plurality of powder removal plate conduits;
wherein the powder removal plate comprises a first side, a second side, and a side wall therebetween, wherein the powder removal plate comprises a fluid distribution system formed therein, the fluid distribution system including a number of internal channels, wherein the internal channels extend from a number of input ports positioned about the side wall of the powder removal plate to a number of internal fluid plenums provided in the powder removal plate, wherein each internal fluid plenum has one or more of the powder removal plate conduits formed therein, and wherein at least some of the internal channels fluidly connect two fluid plenums with each other;
manufacturing the component on the flat build plate such the plurality of component voids aligns with the plurality of build plate conduits;
after manufacturing the component, flowing a pressurized fluid through the plurality of powder removal plate conduits and the plurality of build plate conduits and into the plurality of component voids; and
forcing the residual powder out of the plurality of component voids.

16. An additive manufacturing system for manufacturing a component with a plurality of component voids therein, comprising:

a source of powder;

a printer for manufacturing the component from the source of powder;

a flat build plate comprising a block of solid metal with a top side and a bottom side for building the component on the top side thereof;

the flat build plate comprising a plurality of build plate conduits that aligns with the plurality of component voids;

a powder removal plate positioned on the bottom side of the flat build plate;

the powder removal plate comprising a first side and a second side and a plurality of powder removal plate conduits that aligns with the plurality of build plate conduits;

wherein the plurality of build plate conduits extend along the first side of the powder removal plate; and a pressurized fluid system in communication with the plurality of powder removal plate conduits such that a fluid extends through the powder removal plate, into the flat build plate, and into the component.

17. The additive manufacturing system of claim 16, wherein the pressurized fluid system comprises a source of a gas fluid or a liquid fluid.

18. The additive manufacturing system of claim 17, wherein the source of the gas fluid or the liquid fluid is in communication with a pressurizing device.

19. The additive manufacturing system of claim 16, wherein the pressurized fluid system pulls a vacuum.

20. The additive manufacturing system of claim 16, further comprising a build platform and wherein the build platform vibrates.

* * * * *